April 26, 1927.  J. C. CARLSON  1,626,508
SURFACING FOR AUTOMOBILE PARTS AND THE LIKE
Filed Jan. 4, 1926
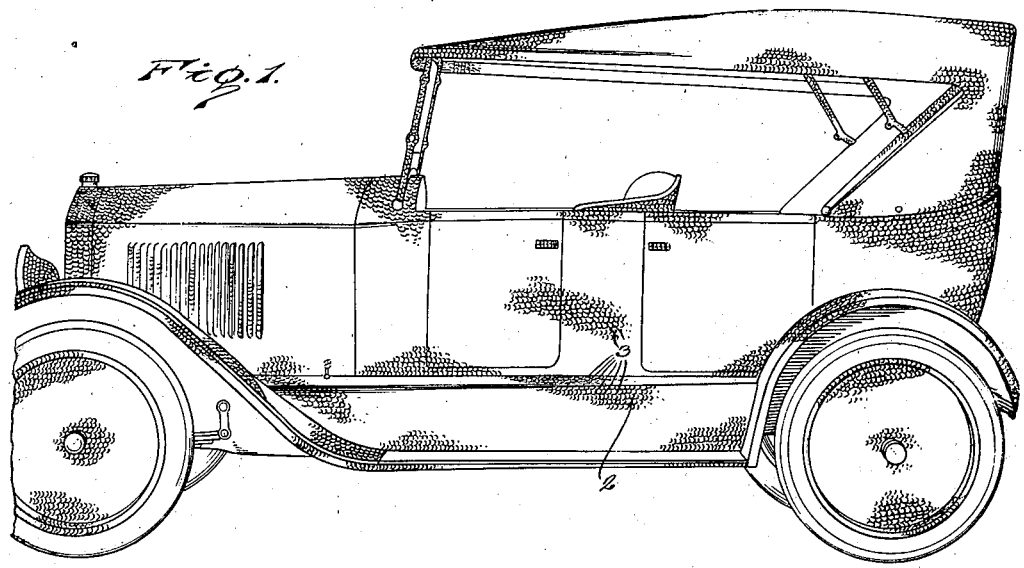
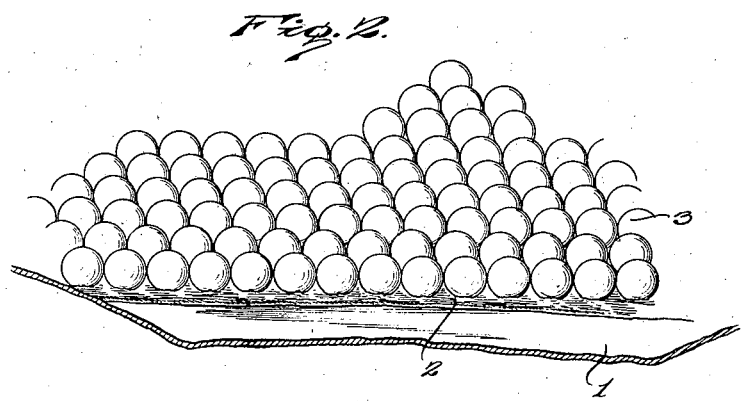
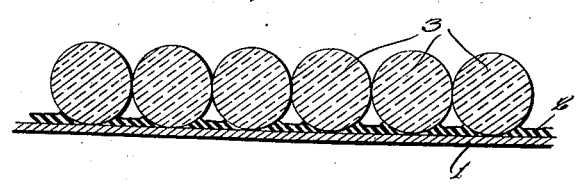
Inventor
J. C. Carlson
By Lacy Lacy, Attorneys Patented Apr. 26, 1927.

1,626,508

UNITED STATES PATENT OFFICE.

JOSEPH C. CARLSON, OF TULSA, OKLAHOMA.

SURFACING FOR AUTOMOBILE PARTS AND THE LIKE.

Application filed January 4, 1926. Serial No. 79,240.

This invention relates to a protective and ornamental surfacing for automobile bodies, fenders, tops, and other parts thereof, although applicable to the surfaces of other vehicles or the like.

It is well known that the enamel with which automobile bodies are finished, soon deteriorates, due to atmospheric changes, and is liable to be marred through collision or other causes of a similar nature, and considerable expense is involved in initially enameling such parts and in refinishing the same. Therefore, it is an object of the present invention to provide a novel surfacing for automobile bodies, fenders, tops, and other exposed parts, which will be more durable than an enamel finish and more ornamental.

Another object of the invention is to provide a surfacing for the exposed parts of an automobile or other vehicle which may be readily applied and which will not involve the time, labor and expense incident to baking of enamel applied to such parts as is now customary and which, furthermore, will not necessitate the employment of skilled labor for its application.

Another object of the invention is to provide a surfacing which will effectually protect the metallic parts to which it is applied, so that such parts will not be subject to deterioration through exposure to the elements and which surfacing, furthermore, will be substantially indestructible.

In the accompanying drawings:

Figure 1 is a perspective view of an automobile to which the surfacing embodying the invention has been applied.

Figure 2 is a fragmentary sectional perspective view illustrating a part of the body of the automobile and, in detail, the character of the surfacing.

Figure 3 is a detail sectional view through a portion of the body or other part of the automobile and illustrating the surfacing on an enlarged scale as compared with Figures 1 and 2.

The surfacing embodying the invention is applicable to the exposed parts of an automobile or other vehicle and will generally be applied to the body, the fenders, and the top of the automobile. As a specific example of the application of the principles of the invention, the numeral 1 indicates, in the drawings, a part, such for example as a portion of the body of an automobile, which may be of metal or any other material of which such part is ordinarily made and which may have its original enameled or other kind of finish applied to its surface, or may be initially devoid of a surface finish. In any event, in the carrying out of the invention there is first applied to the surface of the part to be finished, a coating 2 of any suitable cement which will preferably possess the properties of drying in a comparatively short period of time, be substantial in texture when dried, be impervious to moisture, and not liable to be softened under temperatures such as attend exposure to the rays of the sun or from the motor of the automobile. This coating of cement is applied in a layer of suitable thickness by means of a brush or by any other medium or method found most expedient and before the layer becomes dry or set, there are applied to the surface of the layer a number of surfacing elements indicated by the numeral 3 which may be in the form of spherical beads of any material found suitable for the purpose, the beads being pressed into the layer of cement so as to become partially embedded therein and preferably to the extent that a portion of the surface of each bead will contact the surface of the part to which the coating of cement has been applied, the coating being of sufficient thickness to partially embed the beads or other surfacing elements, as clearly shown in Figure 3 of the drawings.

Preferably, the beads or other surfacing elements 3 will be so applied as to contact one another, as illustrated clearly in the several figures of the drawing, and the arrangement will preferably be such that there will be minimum space between relatively adjacent beads so that the completed surfacing will present a highly ornamental appearance and the cement layer 2 will be substantially concealed. It will be understood, of course, that the surfacing elements 3 may be of any desired contour and color and they may be so applied and partially embedded in the cement layer 2 as to form any desired ornamental design. Likewise, the cement 2 may be of any desired color.

The surfacing elements 3 may be of any material found suitable for the purpose, such for example as beads which may be purchased at a low cost and which are relatively hard and not liable to fracture, the general purpose being to employ a material which will withstand shocks and impacts and not be subject to deterioration upon exposure to the elements.

As previously stated, the elements 3 may possess any desired geometrical contour so that while the drawings illustrate the elements as of spherical form, they may possess various forms or contours and, of the total number of such elements applied to the parts to be surfaced or finished, some may be of one contour and others of another contour.

Having thus described the invention, what I claim is:

An ornamented object comprising a material having thickness, a cementitious coating applied to a surface of said material, and a layer of surfacing elements of substantially uniform geometric contour and greater diameter than the depth of the coating, said elements having minor portions embedded in the coating and contacting with the outer face of said material and said elements projecting from the said coating an appreciable extent and having their adjacent side portions contacting with each other.

In testimony whereof I affix my signature.

JOSEPH C. CARLSON. [L. S.]